United States Patent Office 3,382,424
Patented May 7, 1968

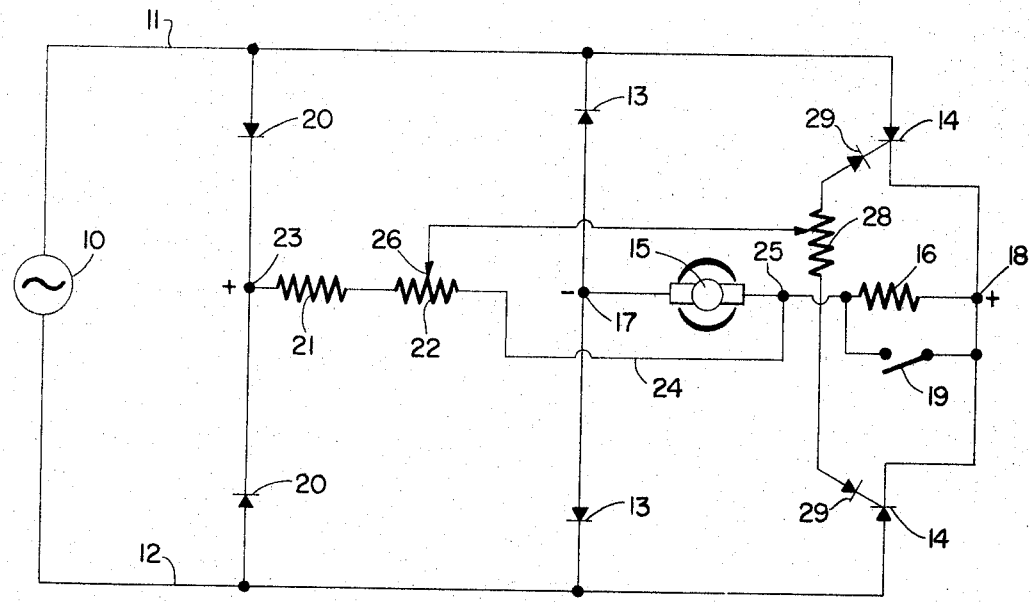

3,382,424
MOTOR CONTROL CIRCUIT FOR D.C. SHUNT
MOTOR USING CONTROLLED RECTIFIERS
Lawrence R. Goetz, Morristown, N.J., assignor to The
Singer Company, New York, N.Y., a corporation of
New Jersey
Filed July 22, 1965, Ser. No. 474,026
4 Claims. (Cl. 318—331)

ABSTRACT OF THE DISCLOSURE

A circuit for supplying variable full-wave rectified current from an A.C. source to a D.C. shunt motor by means of a first bridge rectifier having an SCR in each of the two adjacent legs has a second bridge rectifier which supplies the firing current for the SCR's. A tapped resistance voltage divider is connected in series with the motor armature winding across the output of the second bridge rectifier in such a manner that the back E.M.F. of the armature opposes the D.C. output of the second bridge rectifier. This arrangement results in placing the armature winding *outside* the series loop circuit furnishing the triggering voltage to the gate-cathode terminals of the SCR's so that the inductance of the armature winding does not delay the rise in gate current and the response time is improved.

---

This invention relates to controlled rectifier circuits for supplying direct current to a load from an alternating current source, and more particularly, to circuits for controlling and regulating the speed of D.C. shunt motors of the commutator type.

The control circuits using semiconductor controlled rectifiers heretofore developed for shunt or permanent magnet motors are rather elaborate in that many components are necessary and the firing circuits for the rectifiers use special pulse forming devices such as transformers, saturable reactors and unijunction transistors which are relatively expensive and not readily adapted for miniaturization through modular circuit techniques.

Semiconductor diodes are readily available at low-cost and in small sizes suitable for use in modular circuits.

It is therefore a principal object of this invention to provide a simplified circuit using controlled rectifiers for controlling and regulating the speed of D.C. shunt type motors and which circuit requires the use of diodes and resistors as the only necessary firing circuit components. A further object is to provide a small, light-weight and inexpensive motor speed-regulating control circuit using fewer circuit components than heretofore thought necessary.

In accordance with an illustrative embodiment of this invention, two bridge rectifiers having a pair of common diodes are connected across a source of A.C. voltage. One of said bridge rectifiers contains a pair of PNPN controlled rectifiers and its output is connected to the armature of a D.C. shunt type motor preferably but not necessarily with some external series resistance. The other bridge rectifier, containing only diodes, has its output connected to a resistance voltage divider in series with the motor armature in such a manner that the back E.M.F. of the armature opposes the D.C. output of the bridge rectifier. A movable slider on the voltage divider connects through a balancing resistor to the gates of both controlled rectifiers and supplies the firing current, which will be seen to be a function of the adjusted slider position and the rotational speed of the armature by virtue of the opposed back E.M.F., to control the firing of both controlled rectifiers to provide a full-wave rectified output for the motor with automatic speed response.

The novel features believed to be characteristic of this invention are set forth in the appended claims. The invention itself, however, along with further objects and advantages thereof, may be best understood by reference to the following detailed description of an illustrative embodiment when read in conjunction with the accompanying drawing wherein:

The single figure is a schematic diagram of a permanent magnet motor speed-regulating control circuit incorporating the principal features of this invention.

With reference to the figure, a permanent magnet motor control circuit supplied from an A.C. voltage source is shown and utilizes a firing circuit for two controlled rectifiers in accordance with this invention. A source of A.C. voltage 10 is connected across a pair of supply lines 11 and 12. A first bridge rectifier comprising a pair of diodes 13—13 and a pair of controlled rectifiers 14—14, is connected across the lines 11 and 12. An armature 15 of a permanent magnet motor is connected in series with a resistor 16 across the output 17–18 of the first bridge rectifier. The resistor 16 is not essential to the invention but may optionally be used as will be explained later. A switch 19 is shown for shunting out the resistor 16 if its effect is not desired.

A second bridge rectifier comprising a pair of diodes 20—20 together with the diodes 13—13, is connected across the lines 11–12. A resistor 21, a potentiometer resistance 22, and the armature 15 are connected in series across the output 23–17 of the second bridge rectifier. It will be noted that the line 24 connects to the armature 15 at a junction 25 on the opposite side of the armature from the common negative output junction 17. The back E.M.F. of the armature 15 is positive at the junction 25 and, as the armature rotational speed increases, this junction 25 will get more positive so that the voltage on an adjustable contact means or slider 26 at any given point on potentiometer resistance 22 will become less positive with respect to junction 25 as the armature speed increases. Thus the actual voltage between the slider 26 and the junction 25 is a function of the position of the slider 26 and the rotational speed of the armature and decreases as the speed increases. It will be seen presently that this voltage between slider 26 and junction 25 (with switch 19 closed) is the voltage which controls the firing of the rectifiers 14—14.

The slider 26 is connected by line 27 to a balancing potentiometer 28 and thence through diodes 29—29 to the gates of the controlled rectifiers 14—14. The purpose of the balancing potentiometer 28 is merely to compensate for any differencies in the firing characteristics of the two controlled rectifiers. If these controlled rectifiers could be selected to have precisely the same firing sensitivity then the potentiometer 28 would not be necessary. The diodes 29 prevent the application of negative voltages to the gate as is well known in this art.

OPERATION

With the switch 19 closed and the armature at standstill, the gate firing voltage applied to both rectifiers 14—14 will be determined by the position of tap 26 and will be positive towards the gate. The shape of this gate firing voltage will be full wave rectified A.C., that is, a series of positive half-wave sine curves in time phase with the voltage of source 10. The anode voltages of the rectifiers 14—14 will, of course, follows the A.C. source voltage but will be relatively phase reversed with respect to each other. Thus, at any given time, the anode of only one of the rectifiers 14—14 can be positive and this determines which rectifier will conduct, assuming the gate firing voltage is sufficient to cause sufficient gate current to flow. As the current in one rectifier 14 is cut-off due to the anode voltage going negative, the other rectifier 14 will conduct because its anode voltage will be going positive and thus the current will be commutated between them by the A.C. anode voltage as is well known in the art. Thus, pulses of unidirectional current will flow through the armature 15 and it will accelerate in speed and develop a back E.M.F. proportional to its speed. As noted above, this back E.M.F. is in a direction to reduce the firing voltage supplied by the potentiometer resistance 22 as a voltage divider. Thus, the reduced net firing voltage due to the back E.M.F. will delay the firing of the rectifiers in each half cycle so that less current is supplied to the armature 15 and a balancing speed will be reached when such current is just sufficient to supply the motor load demand at that speed. This may occur with current being supplied during every cycle or, for very light loads, the rectifiers may be cut off for one or more full cycles of the source voltage. In any case, due to the speed regulating action above described, the setting of the slider 26 will determine the rotational speed of the armature 15 and the motor will tend to run at this speed within the limits of the source to supply the load current.

In the above explanation, with switch 19 closed, it was assumed that the voltage across the armature 15 from junction 17 to junction 25 was equal to the back E.M.F. ($Eg$). Actually it is equal to $Eg + I_aR_a$ where $I_a$ is the armature current and $R_a$ is the armature resistance. Thus, the armature terminal voltage is not a true measure of the armature speed but is greater than the true value by the amount of armature resistance drop $I_aR_a$. This is an error which shows up at low speeds where $Eg$ is low and $I_aR_a$ is therefore a larger percentage of $Eg$. This error, which may result in poor torque-speed characteristics at low speeds, may be compensated by inserting a resistor 16 (by opening switch 19) between the common junction 18 of the cathodes of rectifiers 14—14 and the junction 25.

It will be seen that with the resistor 16 in the circuit carrying the load current supplied by the rectifiers 14—14, the voltage at junction 25 will now be influenced directly by the load current and will become more negative as the load current increases. Thus, the effect of resistor 16 with increasing load current is to increase the voltage between slider 26 and junction 25, which is the voltage supplying firing current for rectifiers 14—14. From a servo standpoint, this load current effect may be regarded as a positive feedback with the back E.M.F. of armature 15 supplying a negative feedback, and indeed it has been found that large values for resistor 16 will cause oscillation in motor speed as would be expected from large values of positive feedback.

However, values for resistor 16 may be found which result in stable operating speeds for the motor and in improved speed-torque characteristics at low speed setting of the slider 26, and although not necessary to the present invention, resistor 16 may be used if desired in a modification thereof.

It will be understood that, although a permanent magnet motor has been shown in the illustrative embodiment of this invention, it is not intended as any limitation of the scope thereof. It will be obvious to those skilled in the art that D.C. shunt motors having field windings excited from a unidirectional current supply, such as terminals 23–17, could be readily substituted for the permanent magnet motor shown.

From the above description it will be apparent that there is provided by this invention a simple circuit for controlling and regulating the speed of D.C. shunt type motors, which circuit supplies controlled full-wave rectified current to the armature and requires, in addition to two controlled rectifiers, only six simple diodes and a single potentiometer resistance, thus making the circuit readily adaptable to miniaturization through modular techniques.

Having thus described the nature of the invention, what I claim herein is:

1. A circuit for controlling and regulating the speed of a D.C. shunt motor having an armature supplied from an A.C. voltage source comprising a first bridge rectifier including a first pair of diodes and a pair of semiconductor controlled rectifiers, each of said controlled rectifiers having an anode, a cathode and a gate, a second bridge rectifier including a second pair of diodes and said first pair of diodes, means connecting the inputs of both of said bridge rectifiers to said A.C. voltage source, means connecting said armature to the output of said first bridge rectifier, a firing circuit for said controlled rectifiers including a resistance connected in series with said armature across the output of said second bridge rectifier, one end of said resistance having a common junction with one end of said armature and with both of the cathodes of said controlled rectifiers, adjustable contact means on said resistance, and means connecting both of said gates to said adjustable contact means for setting the speed of said motor.

2. A circuit for controlling and regulating the speed of a D.C. shunt motor having an armature supplied from an A.C. voltage source comprising a first bridge rectifier including a first pair of diodes and a pair of semiconductor controlled rectifiers, each of said controlled rectifiers having an anode, a cathode and a gate, a second bridge rectifier including a second pair of diodes and said first pair of diodes, means connecting the inputs of both bridge rectifiers to said A.C. voltage source, a first resistance connected in series with said armature across the output of said first bridge rectifier, a firing circuit for said controlled rectifiers including a second resistance connected in series with said armature across the output of said second bridge rectifier, one end of said second resistance being connected to the common junction between the armature and said first resistance, adjustable contact means on said second resistance, and means connecting both of said gates to said adjustable contact means for setting the speed of said motor.

3. A circuit for controlling and regulating the speed of a D.C. shunt motor having an armature supplied from an A.C. voltage source comprising a first bridge rectifier having positive and negative output terminals and including a first pair of diodes and a pair of semiconductor controlled rectifiers, each of said controlled rectifiers having an anode, a cathode and a gate, a second bridge rectifier having positive and negative output terminals and including a second pair of diodes and said first pair of diodes, said negative output terminals providing a junction common to both bridge rectifiers, means connecting the inputs of said bridge rectifiers to said A.C. voltage source, means connecting the armature to the output terminals of said first bridge rectifier, a firing circuit for said controlled rectifiers including a resistance connected between the positive output terminals of the bridge rectifiers, adjustable contact means on said resistance and means connecting both of said gates to said adjustable contact means for setting the speed of said motor.

4. A circuit for controlling and regulating the speed of a D.C. shunt motor having an armature supplied from an A.C. voltage source comprising first and second bridge rectifiers connected to said A.C. voltage source and having a common negative output terminal and two positive output terminals, a pair of semi-conductor controlled rectifiers connected in said first one of said bridge rectifiers with the cathodes joined to form the positive output terminal thereof, said armature being connected to the output terminals of said first bridge rectifier, a resistance connected between said two positive output terminals, and adjustable means connecting a selectable point on said resistance to the gates of both controlled rectifiers to select the speed of said motor.

References Cited

UNITED STATES PATENTS

| | | | |
|---|---|---|---|
| 3,127,550 | 3/1964 | Gilbreath et al. | 318—331 |
| 3,214,667 | 10/1965 | Foster et al. | 318—345 |
| 3,222,585 | 12/1965 | Lobb | 318—331 XR |
| 3,222,586 | 12/1965 | Fontenote et al. | 318—308 |

ORIS L. RADER, *Primary Examiner.*

G. R. SIMMONS, *Assistant Examiner.*